(12) United States Patent
Mohammad et al.

(10) Patent No.: US 12,544,002 B2
(45) Date of Patent: Feb. 10, 2026

(54) SYSTEMS AND METHODS FOR PATIENT-SPECIFIC EPILEPTIC SEIZURE PREDICTION

(71) Applicants: Umair Mohammad, Miami, FL (US); Fahad Saeed, Miami, FL (US)

(72) Inventors: Umair Mohammad, Miami, FL (US); Fahad Saeed, Miami, FL (US)

(73) Assignee: The Florida International University Board of Trustees, Miami, FL (US)

(*) Notice: Subject to any disclaimer, the term of this patent is extended or adjusted under 35 U.S.C. 154(b) by 14 days.

(21) Appl. No.: 18/341,967

(22) Filed: Jun. 27, 2023

(65) Prior Publication Data
US 2025/0000437 A1    Jan. 2, 2025

(51) Int. Cl.
G06N 3/09 (2023.01)
A61B 5/00 (2006.01)
A61B 5/372 (2021.01)
G06N 3/02 (2006.01)
G06N 3/096 (2023.01)
G16H 50/20 (2018.01)

(52) U.S. Cl.
CPC .......... *A61B 5/4094* (2013.01); *A61B 5/372* (2021.01); *A61B 5/7267* (2013.01); *G06N 3/02* (2013.01); *G06N 3/096* (2023.01); *G16H 50/20* (2018.01)

(58) Field of Classification Search
CPC ........ G06N 20/00; G06N 7/046; G06N 5/047; G06N 5/02; G06N 7/01; G06N 3/02; G06N 3/084; G06N 20/20; G06N 5/022
See application file for complete search history.

(56) References Cited

U.S. PATENT DOCUMENTS

2022/0223295 A1*  7/2022  Sughrue .......... G01R 33/56341

OTHER PUBLICATIONS

Cao et al., Epileptic Classification With Deep-Transfer-Learning-Based Feature Fusion Algorithm, 2021 (Year: 2021).*
Hosseini et al., Optimized Deep Learning for EEG Big Data and Seizure Prediction BCI via Internet of Things, 2017 (Year: 2017).*
Lopes et al., Epilepsy Prediction Using Deep Learning in HPC, (Year: 2018).*
Mekruksavanich et al., ResNet-SE: Channel Attention-Based Deep Residual Network for Complex Activity Recognition Using Wrist-Worn Wearable Sensors, 2022 (Year: 2022).*

(Continued)

*Primary Examiner* — Van C Mang
(74) *Attorney, Agent, or Firm* — SALIWANCHIK, LLOYD & EISENSCHENK (57) ABSTRACT

A patient specific epileptic seizure(ES) prediction model using only electroencephalography (EEG) data with residual neural networks (ResNets) and transfer learning (TL) techniques (i.e., SPERTL) is provided. One exemplary provided model was trained on EEG data from 23 patients with a seizure prediction horizon (SPH) of 5 minutes and used the validation data to plot precision-recall curves to aid in selecting preferred thresholds. Testing on unseen data shows the provided model outperforms related art methods by achieving the highest average sensitivity of 88.1%, specificity of 92.3%, and accuracy of 92.3%. Results also demonstrate the proposed model is less susceptible to false positives while maintaining a high positive prediction rate.

17 Claims, 6 Drawing Sheets

(56) References Cited

OTHER PUBLICATIONS

Jung et al., Restructuring Batch Normalization To Accelerate CNN Training, 2019 (Year: 2019).*
Cai et al., Efficient and Effective Dropout for Deep Convolutional Neural Networks, 2020 (Year: 2020).*
Li et al., A Parallel Multi-Scale Time-Frequency Block Convolutional Neural Network Based On Channel Attention Module For Motor Imagery Classification, 2022 (Year: 2022).*
Ajith et al., EEG Based Mental State Analysis, 2021 (Year: 2021).*

* cited by examiner

SYSTEMS AND METHODS FOR PATIENT-SPECIFIC EPILEPTIC SEIZURE PREDICTION

GOVERNMENT SUPPORT

This invention was made with government support under 2213951 awarded by the National Science Foundation. The government has certain rights in the invention.

BACKGROUND

Epilepsy is a neurological disorder that causes repeat unprovoked seizures and affects over 3.4 million people in the USA and over 65 million worldwide. An epileptic seizure(ES) is defined as two or more unprovoked recurring seizures with a gap greater than 1 day. During a seizure, increased electrical activity of the brain results in symptoms including but not limited to shaking, convulsions, and short-term memory loss. Seizures can include one or more of the following phases: aura, preictal (before a seizure), ictal (main seizure activity) and interictal (period between two seizures). Repeat seizures can be debilitating because they interfere with daily activities, can lead to social stigma, and can potentially result in serious injury or death. Although treatable with medications or surgical resection, epilepsy can become drug-resistant and many patients can be excluded from surgery due to comorbidities and other risk factors, risk of loss of cognitive functions, failure to localize epileptogenic zone or even low socioeconomic status.

Existing commercial solutions based on wearables are only capable of detection based on movement sensors which are unreliable, exclude some types of seizures, and have a high drop-rate due to their unreliability. Alternative seizure control methods based on implants such as responsive neuro stimulation (RNS) and vagus nerve stimulation (VNS) have some of the same obstacles (e.g., cost, complexity, and risks) as surgical solutions. Consequently, the focus has shifted to seizure prediction using electroencephalography (EEG) data which directly measures electrical activity of the brain. Although the protocol for diagnosing epilepsy in clinical settings is well-established, ES prediction with EEG for use in ambulatory settings remains a significant challenge, especially the design of accurate predictive models.

BRIEF SUMMARY

Epilepsy is a chronic condition that causes repeat unprovoked seizures and many epileptics either develop resistance to medications and/or are not suitable candidates for surgical solutions. Hence, these recurring unpredictable seizures can have a severely negative impact on quality of life including an elevated risk of injury, social stigmatization, inability to take part in essential activities such as driving and possibly reduced access to healthcare.

Embodiments of the subject invention provide a predictive system that informs patients and caregivers about a potential upcoming seizure ahead of time. Embodiments provide patient-specific epileptic seizure(ES) prediction models using only electroencephalography (EEG) data with residual neural networks (ResNets) and transfer learning (TL), also referred to as epileptic Seizure Prediction using EEG with ResNets and Transfer Learning (SPERTL).

In an embodiment, a system for patient-specific ES prediction from raw EEG data with a deep learning (DL) model based on a ResNet and TL can comprise: a processor; and a (non-transitory) machine-readable medium (in operable communication with the processor) having instructions stored thereon that, when executed by the processor perform the following steps: providing a trained DL model (or training the DL model) for binary classification of a first disorder, the trained DL model having been trained on a first dataset comprising time indexed sensor response data and disorder occurrence data for at least one million patients to produce a first trained DL model; further training the first trained DL model for binary classification of an ES disorder with TL on a second dataset comprising time indexed raw EEG data and ES occurrence data for less than one million patients to produce a second trained DL model; processing a stream of real time, time indexed, raw EEG data from a patient through the second trained DL model to produce a binary classification prediction of either Seizure or No-Seizure for a specified seizure prediction horizon (SPH) time period; and communicating, either to the patient or to a caregiver for the patient, the binary classification prediction of either Seizure or No-Seizure for the specified SPH, thus providing the ES prediction from raw EEG data. The second trained DL model can be a ResNet DL model configured to accept raw EEG data as input to a convolutional input block followed by a multiplicity of residual blocks and a fully connected layer, producing the binary classification prediction. Each respective residual block of the multiplicity of residual blocks can comprise a single input convolutional block and a dual input convolutional block, the dual input convolutional block accepting (i) the output of the single input convolutional block within the residual block, and (ii) the output of a skip connection from the previous block, after max pooling and 1×1 convolution. Each respective dual input convolutional block can comprise a convolution filter, followed by an input junction configured to receive the skip connection from the previous block, followed by a batch normalization, followed by a rectified linear unit (ReLU) activation, followed by a dropout. Each respective single input convolutional block can comprise a convolution filter, a batch normalization, a ReLU activation, and a dropout. The convolutional input block can comprise an input convolution filter, an input batch normalization, an input rectified linear unit (iReLU) activation, and/or an input dropout. The input convolution filter can feed the input batch normalization, the input batch normalization can feed the iReLU activation, and/or the iReLU activation can feed the input dropout. The multiplicity of residual blocks can comprise 4 respective residual blocks. A dropout probability in the convolutional input block can be zero; and/or a respective dropout probability in each respective single input convolutional block and in each respective dual input convolutional block can be between about 0.5 about 0.8 for all other convolutional blocks inside each respective residual block. The ResNet DL model can comprise sigmoid activation for classification prior to producing the binary classification prediction.

In another embodiment, a method for patient-specific ES prediction from raw EEG data with a DL model based on a ResNet and TL can comprise the following steps: providing (e.g., by a processor) a ResNet DL model trained (or training the ResNet DL model) for binary classification of a first disorder on a first dataset comprising time indexed sensor response data and disorder occurrence data for at least 1 million patients to produce a first trained DL model; further training providing (e.g., by the processor) the first trained DL model for binary classification of an ES disorder with TL on a second dataset comprising time indexed raw EEG data and ES occurrence data for less than 1 million patients to produce a second trained DL model; processing (e.g., by the processor) a stream of real time, time indexed, raw EEG data from a patient through the second trained DL model to produce a binary classification prediction of either Seizure or No-Seizure for a specified seizure prediction horizon (SPH) time period; and communicating (e.g., by the processor), either to the patient or to a caregiver for the patient, the binary classification prediction of either Seizure or No-Seizure for the specified SPH, thus providing the ES prediction from raw EEG data. The ResNet DL model can be configured to accept raw EEG data as input to a convolutional input block followed by a multiplicity of residual blocks and a fully connected layer, producing the binary classification prediction. Each respective residual block of the multiplicity of residual blocks can comprise a single input convolutional block and a dual input convolutional block, the dual input convolutional block accepting (i) the output of the single input convolutional block within the residual block, and (ii) the output of a skip connection from the previous block, after max pooling and 1×1 convolution. Each respective dual input convolutional block can comprise a convolution filter; followed by an input junction configured to receive the skip connection from the previous block; followed by a batch normalization; followed by a rectified linear unit (ReLU) activation, followed by a dropout. Each respective single input convolutional block can comprise a convolution filter, a batch normalization, a ReLU activation, and a dropout. The convolutional input block can comprise an input convolution filter, an input batch normalization, an input rectified linear unit (iReLU) activation, and/or an input dropout. The input convolution filter can feed the input batch normalization; the input batch normalization can feed the iReLU activation; and/or the iReLU activation can feed the input dropout. The multiplicity of residual blocks can comprise 4 respective residual blocks. A dropout probability in the convolutional input block being zero; and/or a respective dropout probability in each respective single input convolutional block and in each respective dual input convolutional block can be between about 0.5 and about 0.8 for all other convolutional blocks inside the residual blocks.

BRIEF DESCRIPTION OF DRAWINGS

FIGS. 1A-1E show a schematic illustration of a model according to an embodiment of the subject invention. FIGS. 1B-1E show detailed views of respective sections of FIG. 1A. FIGS. 1C-1E show a block overview of the model.

DETAILED DESCRIPTION

Embodiments provide a model trained on EEG data from 20 patients with a seizure prediction horizon (SPH) of 5 minutes and use the validation data to plot precision-recall curves for selecting advantageous thresholds. Testing on unseen data shows the provided model outperforms related art methods by achieving the highest average sensitivity of 88.1%, specificity of 92.3%, and accuracy of 92.3%. Results also demonstrate the provided model is less susceptible to false positives while maintaining a high positive prediction rate.

Embodiments provide systems and methods for designing, training, and application of a deep learning (DL) model based on a residual neural network (ResNet) for epileptic seizure prediction from only raw electroencephalography (EEG) data. The inventors advantageously applied techniques from transfer learning (TL) to re-train a model which had been designed for similar data but a different task (i.e., prediction of cardiac events from the electrocardiogram (ECG).) Embodiments apply ResNets directly to raw EEG data for epileptic seizure prediction and demonstrate positive results without applying any artificial techniques to inhibit class-imbalance, as explained in Example 1, below. Testing results showed that when compared to related art systems and methods, the provided model achieved the highest average sensitivity of 88.1% (improvement of 5.4%), specificity of 92.3% (improvement of 14.4%), and accuracy of 92.3% (improvement of 19.9%).

Embodiments of the subject invention have numerous advantages compared to related art systems and methods, including but not limited to the following. Certain embodiments advantageously employ a prediction technique that is independent of preictal duration. Embodiments provide a higher accuracy compared to related art models that consider class-imbalance, improving access for patients who are under-represented in healthcare. Embodiments provide systems and methods that are deployable with wearable EEG only, which avoids the 25 need for costly and invasive surgical implants. Advantageous use of EEG data improves accuracy compared to models that rely upon less reliable data such as movement sensors.

Clinically and commercially advantageous applications of embodiments of the subject invention include but are not limited to the following. Embodiments can provide a base model for the design of a new innovative models from scratch to push the boundaries of ML/AI based seizure prediction. Embodiments can be used to develop a hardware friendly form with techniques such as binary ResNet. Certain embodiments advantageously incorporate wearable EEG, facilitating functional testing for field use.

It is contemplated within the scope of certain embodiments of the subject invention that the designed models will be deployed for real-time seizure prediction using cloud computing and/or edge computing techniques with wearable EEG sensors, including but not limited to a device optimized for use in ambulatory care settings.

Embodiments provide systems and methods to design and develop an ML model for patient-specific ES prediction based on the residual neural network (ResNet) and transfer learning (TL), and systems and methods for application of the model(s) produced thereby. One embodiment of the provided model, SPERTL, performs epileptic Seizure Prediction using only EEG data by applying ResNets with Transfer Learning. ResNet is a form of convolutional neural network (CNN) that features additional residual layers with skip connections. ResNet has been shown to provide the highest performance for ImageNet classification when trained on 1.28 million images with 2 million parameters and has found use in time-series classification. TL, on the other hand, works by re-training a successfully pre-trained model for one problem on another problem with either a different task or a different domain with the same task. Re-usage of pre-trained models with TL is of high research and commercial interest due to the amount of resources (time, money, energy, etc.) used for training these models in the first place.

Initially, techniques such as the recurrent neural network (RNN), gated recurrent unit (GRU) and LSTM were popular for time-series classification but 1d-CNNs have also shown utility. Adding residual layers further enhances CNN performance as a recent benchmark shows that ResNets provide the best performance for time-series classification. Overall, ResNets provide superior performance, are better able to inhibit overfitting compared to CNNs, and can deal with class imbalance. All of these properties are desirable for the ES prediction task with severe class-imbalance (e.g., less than 2% of the EEG recordings in the Children Hospital Boston-Massachusetts Institute of technology (CHB-MIT) dataset contain seizure activity) (see also Shoeb et al., Application of Machine Learning To Epileptic Seizure Detection, in ICML, January 2010, pp. 975-98, icml.cc/Conferences/2010/papers/493.pdf; which is hereby incorporated by reference herein in its entirety). To design the ResNet, embodiments can either start from scratch or adopt well-known architectures (e.g., ResNet101). Embodiments can advantageously employ TL because it speeds up the model development process, can achieve a higher accuracy compared to a completely new architecture, and enhance the accuracy when there is less data by transferring the knowledge from models trained on larger datasets. In one embodiment, the adopted model was trained on a dataset of >2.5 million patients whereas for patient-specific ES prediction, data is available from only 1 patient at a time.

Embodiments provide a first DL model trained on a dataset having data from at least 1 million patients, alternatively at least 500 thousand, 2 million, 2.5 million, 3 million, 5 million, or more, including combinations, ranges, and fractions thereof. Embodiments provide a second DL model created through TL on the first DL model, the TL using a dataset having data from less than 1 million patients, alternatively less than 500 thousand, 100 thousand, 10 thousand, 1 thousand, or less, including combinations, ranges, and fractions thereof.

Embodiments provide a first DL model trained on a first dataset of a known size, and a second DL model created through TL on the first DL model, the TL using a second dataset smaller than the first dataset. In certain embodiments the second dataset is 10% smaller than the first dataset, alternatively 20%, 30%, 40%, 50%, 60%, 70%, 80%, or 90% smaller, including combinations, ranges, and fractions thereof. In certain embodiments the second dataset is an order of magnitude smaller than the first dataset, alternatively 2 orders of magnitude, 3 orders of magnitude, 4 orders of magnitude, 5 orders of magnitude, to more than 5 orders of magnitude smaller, including combinations, ranges, and fractions thereof.

Embodiments provide a novel ResNet for ES prediction from raw EEG data with TL, that does not require an assumption of a large preictal period within which a seizure should be predicted. Rather, a stricter approach is used as explained below.

The complete data is used for seizure prediction which better reflects the real-world scenario where the occurrence of a seizure is expected to be an extremely rare event. Related art systems and methods use only parts of the EEG recordings to inhibit the class imbalance. Thus, embodiments achieve a higher accuracy compared to the related art given these constraints.

With the advent of machine learning (ML), researchers have leveraged large amounts of data collected from long-term EEG recordings, such as the CHB-MIT) dataset, to develop related art predictive models. Another clinically and commercially useful data set is the Temple University Seizure Corpus, which has data from a total of 675 patients (579 for training, 53 for validation and 43 for testing.) Other datasets now known in the art, or later published, created, discovered, or developed are contemplated for use with embodiments of the subject invention. Early ES prediction models involved feature extraction with time-frequency analysis e.g., continuous/discrete wavelet transform (CWT/DWT) or a version of the Fast Fourier Transform (FFT) followed by traditional techniques such as the support vector machine (SVM), random forest (RF), naive Bayes (NB) or the neural network (NN). Unfortunately, these techniques reached a performance ceiling. The introduction of deep learning (DL) has revived interest in seizure prediction because of its ability to provide a superior performance and do end-to-end prediction from raw EEG data which is desirable for deployment on low-cost hardware. DL techniques include deep NN (DNN), convolutional NN (CNN), long short-term memory (LSTM) and the generative adversarial network (GAN), etc.

Though DL application to raw data is desirable, some related art systems and methods apply DL techniques after manual feature extraction.

In contrast, other related art systems and methods are end-to-end and achieve a sensitivity >98%, but must assume balanced classes whereas seizures are very rare events making the problem severely imbalanced. For example, some related art systems and methods select data samples such that there is an equal preictal and ictal duration whereas other related art systems and methods artificially increase amount of preictal data by using overlapping segments while keeping the interictal non-overlapping; both are not reflective of the real world.

Some related art systems and methods take into account the class imbalance and design simple 1d-CNNs for ES prediction. Therefore, they suffer from low performance with average sensitivities of 81.9%, 68.8% and 76.6%, respectively. Furthermore, some related art systems and methods use a Bi-LSTM for classification, shows models tested after eliminating imbalance perform poorly when tested with the complete data. For example, the performance of the model in a related art system comes down to below 70% from a near-perfect score. Table I summarizes details of certain related art models.

TABLE I

| COMPARISON OF EXISTING MODELS IN THE LITERATURE FOR ES PREDICTION. | | | | | |
|---|---|---|---|---|---|
| Ref. | Feature Extraction | End-to-end? | Classifier | Class-imbalance | Sensitivity |
| [9] | FT + Genetic Algorithm | No | Logistic Regression | Considered | 61.7% |

TABLE I-continued

COMPARISON OF EXISTING MODELS IN THE LITERATURE FOR ES PREDICTION.

| Ref. | Feature Extraction | End-to-end? | Classifier | Class-imbalance | Sensitivity |
|---|---|---|---|---|---|
| [10] | Several Handcrafted | No | Ensemble (SVM, CNN, LSTM) | GANs | 96.3% |
| [11] | Short-time FT | No | LSTM | GANs | 93.0% |
| [12] | AB + CNN | Yes | LSTM | Equal preictal and interictal | 99.6% |
| [13], [14] | CWT conversion to 2D images | Yes | Semi-Dilated CNN + PC | Equal preictal and interictal | 99.7% |
| [15] | Neural arch. search + CNN | Yes | FC | Overlapping preictal segments | 99.8% |
| [16] | CNN with 1D & 2D pooling (each lead a dimension) | Yes | FC | Overlapping preictal segments | 98.8% |
| [17] | CNNs | Yes | FC | Considered | 81.9% |
| [18] | CNNs | Yes | FC | Considered | 68.8% |
| [19] | CNNs | Yes | Bi-LSTM | Considered | 76.6% |

As observable from Table 1, existing techniques for ES prediction from raw EEG data mostly focus on simple 1-D CNNs or LSTM networks for feature extraction and prediction whereas embodiments of the subject invention are the first to introduce ResNet. Moreover, related art works do not include all of the data for training and testing or use techniques to inhibit class imbalance which is not reflective of the real-world. In contrast, the works that consider the whole dataset do not achieve high performance metrics. Embodiments of the subject invention are the first to introduce ResNets for ES prediction with a higher performance on class-imbalanced data.

Embodiments of the subject invention address the technical problem of predicting seizures being expensive, unreliable, and difficult to practice in ambulatory care and other real-world environments, where a predictive solution for seizures does not exist in the related art and related art solutions rely on other less reliable data modalities such as heart rate sensors, movement sensors, and accelerometers in their attempts to detect (but not predict) seizures. This problem of predicting seizures ahead of time is addressed by providing digital processing of raw EEG data, in which a machine learning method applying a combination of advanced techniques is utilized to categorize temporal periods of EEG data as either pre-ictal (leading to a seizure) or interictal (not leading to a seizure) segments.

When ranges are used herein, combinations and subcombinations of ranges (e.g., subranges within the disclosed range) and specific values therein are intended to be explicitly included. When the term "about" is used herein, in conjunction with a numerical value, it is understood that the value can be in a range of 95% of the value to 105% of the value, i.e., the value can be +/−5% of the stated value. For example, "about 1 kg" means from 0.95 kg to 1.05 kg.

The methods and processes described herein can be embodied as code and/or data. The software code and data described herein can be stored on one or more machine-readable media (e.g., computer-readable media), which may include any device or medium that can store code and/or data for use by a computer system. When a computer system and/or processor reads and executes the code and/or data stored on a computer-readable medium, the computer system and/or processor performs the methods and processes embodied as data structures and code stored within the computer-readable storage medium.

It should be appreciated by those skilled in the art that computer-readable media include removable and non-removable structures/devices that can be used for storage of information, such as computer-readable instructions, data structures, program modules, and other data used by a computing system/environment. A computer-readable medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); network devices; or other media now known or later developed that are capable of storing computer-readable information/data. Computer-readable media should not be construed or interpreted to include any propagating signals. A computer-readable medium of embodiments of the subject invention can be, for example, a compact disc (CD), digital video disc (DVD), flash memory device, volatile memory, or a hard disk drive (HDD), such as an external HDD or the HDD of a computing device, though embodiments are not limited thereto. A computing device can be, for example, a laptop computer, desktop computer, server, cell phone, or tablet, though embodiments are not limited thereto.

A greater understanding of the embodiments of the subject invention and of their many advantages may be had from the following examples, given by way of illustration. The following examples are illustrative of some of the methods, applications, embodiments, and variants of the present invention. They are, of course, not to be considered as limiting the invention. Numerous changes and modifications can be made with respect to embodiments of the invention.

Example 1—SPERTL Model Design and Implementation

Data was drawn from the CHB-MIT dataset, which comprises approximately 24-hour wearable EEG scalp recordings from 23 patients split into files of approximately 1-hour recordings each, with 1 patient providing 2 sets for a total of 24 recordings. The data was collected from 23 electrodes placed using the international 10-20 system sampled at 256 Hz with a 16-bit resolution. A total of 198 seizure events were recorded and they are clearly marked in the annotation files which states the number of seizures in every recording as well as the respective start and end times for each seizure. The data was split into smaller segments of $T_{seg}S$ to be used as raw input to the model, for an end-to-end DL model without any manual feature extraction. Two important concepts in ES prediction include the seizure prediction horizon (SPH), which defines how far ahead the seizure should be predicted, and the seizure occur period (SOP), which is the window of time within which the seizure should occur. The terms SPH and SOP are defined explicitly herein, because they can be used interchangeably in related art literature.

With respect to the data, let us further define the start duration of the seizure as marked by experts as $t_{start}$ and the end by $t_{end}$. Then, any segment that contains even one reading falling within the window of the seizure duration is considered an ictal segment. An additional variable defining the desired prediction time $T_{pred}$ represents the duration before start of a seizure such that the segment that contains the first reading $t_{start}$-$T_{pred}$ will be associated with the preictal label. All subsequent segments before $t_{start}$ will be marked as preictal and all remaining segments interictal. In this way, the prediction problem can be reformulated as a simple classification task.

The choices for $T_{seg}$ and $T_{pred}$ will dictate the accuracy and will be further dictated by how far ahead the user wants to be warned of an upcoming seizure. In this Example, set $T_{pred}$ or the SPH to be 5 minutes. Do not evaluate the provided model based on its capability to predict a seizure within a given SOP (e.g., an SOP which is set to 30 minutes). Rather, use a more stringent evaluation and purely quantify its performance based on the capability to correctly predict all preictal segments. More details about the evaluation metrics are provided after the model description; direct comparison regarding the capability to predict seizures within a given SOP are contemplated within the scope of the subject invention.

As described in this exemplary and non-limiting example, the provided model, SPERTL, applies TL to a ResNet architecture. TL is characterized by a source task S and a target task T. Each task has a domain denoted by $D_S$ and $D_T$ comprising the feature space ($X_S$ and $X_T$) and associated probability distributions $P(X_S)$ and $P(X_T)$. The tasks are defined by the labels $Y_S$ and $Y_T$ and the predictive functions are $P_S$ and $P_T$. Because the provided tasks are the same (binary classification of a disorder), it is a heterogeneous TL problem since $X_T \neq X_S$. However, the feature space is only different in the sense that the raw EEG data with 23 leads will have a different shape than the ECG data with 12 leads. In contrast, the overall strategy is justified because the final feature space after the convolutional layers is similar. These layers are considered automatic feature extractors. In the provided model, embodiments modify the input layer and re-train the residual to do domain adaptation whereas the fully connected (FC) layers perform the function of $P_T$ which is re-trained using $P_S$ as a starting point.

In this exemplary and non-limiting embodiment, the overall model accepts raw EEG data as input into a convolutional block, which is followed by 4 residual blocks for feature extraction. The output of the last block is flattened, and an FC layer is introduced for classification. The convolutional block comprises a convolution filter, batch normalization, rectified linear unit (ReLU) activation, followed by dropout. Each residual block features 2 convolutional blocks. The first convolutional block is called the single input convolutional block (SICB). The second convolutional block, called the dual input convolutional block (DICB), accepts the output of the previous convolutional block within the residual block, and also the output of the skip connection from the previous block after max pooling and 1×1 convolutional. In the first SICB which accepts the raw EEG data as input, the dropout probability is set to zero. For all other SICB as well as all DICB, the dropout probability is set to 0.8. In this embodiment, there is one primary SICB that accepts raw EEG data and one SICB in each respective downstream residual block. All of these SICBs are structurally identical. The only difference between the first SICB and successive SIBCs is the dropout probability. The primary SICB has Pdrop=0 whereas the all SICBs in the residual blocks have Pdrop=0.8. The convolutional filter length starts with 64, increasing by 64 in each subsequent residual block. The provided implementation is adapted to start with channel length similar to the input size which can range from 1024 to 5120 depending upon the selection of segment duration and is sub-sampled by 4 after every residual block. The output of the last residual block is flattened followed by the FC layers and sigmoid activation for classification. FIGS. 1A-1E illustrate this embodiment of the model.

Figure 1A:
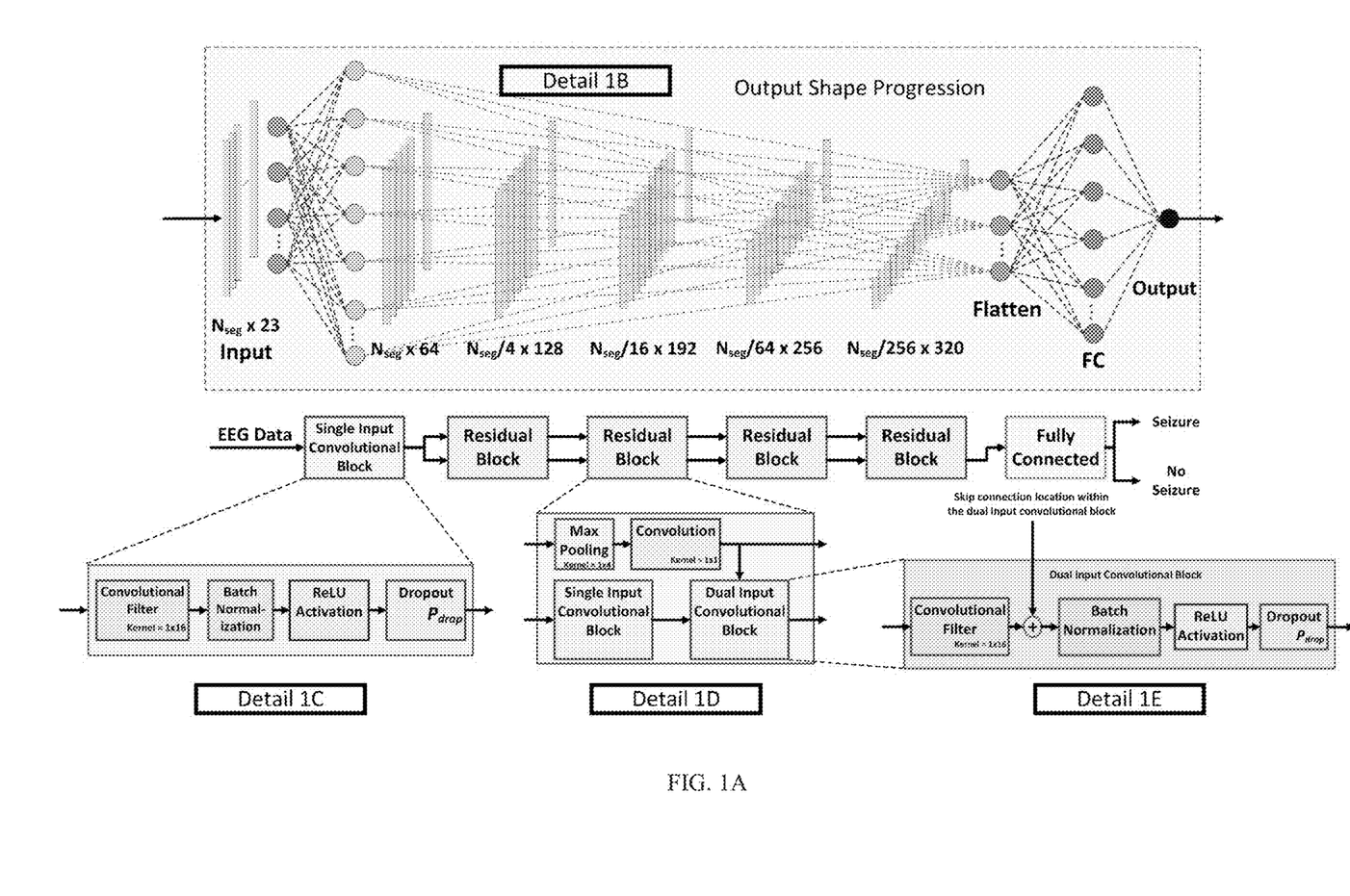
Figure 1B:
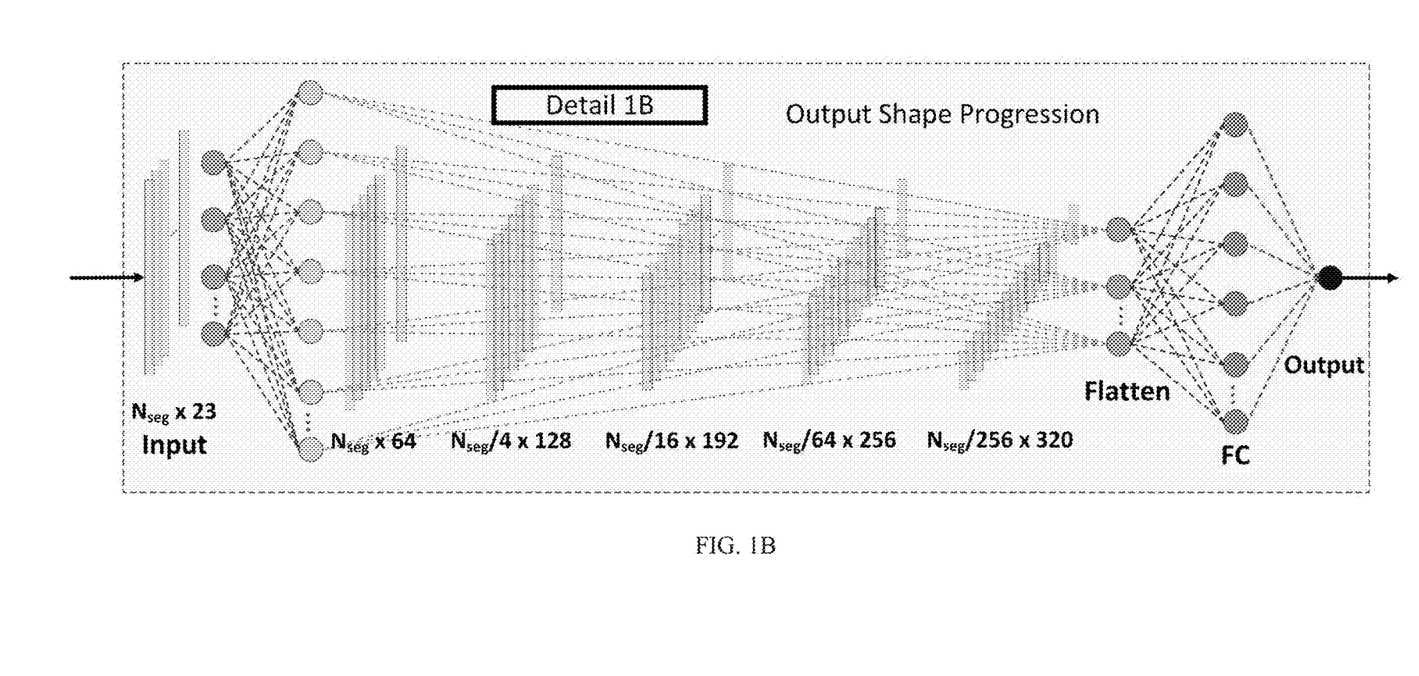
FIG. 1B shows how the output shape changes over successive residual layers.
Figure 1C:
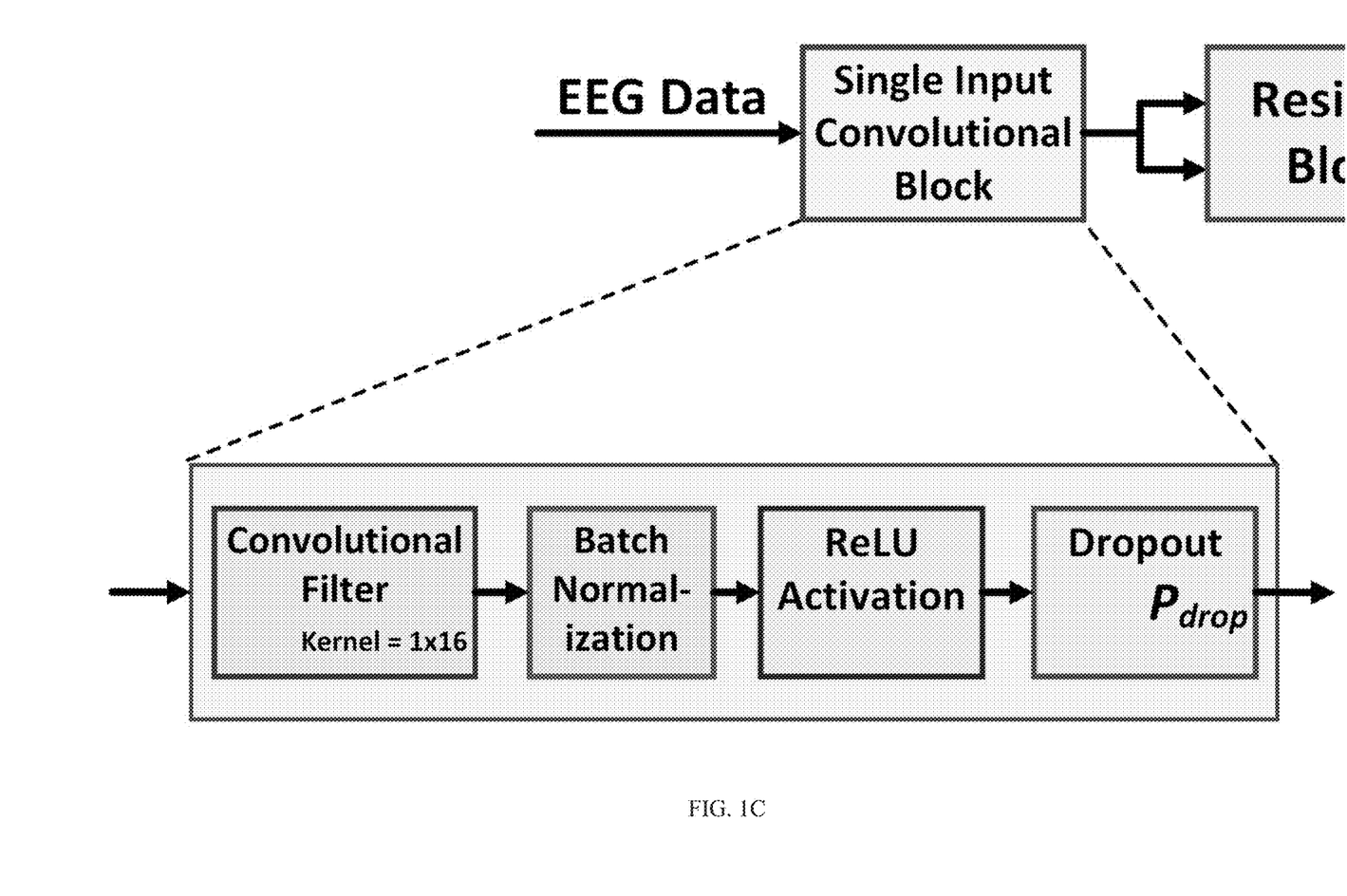
FIG. 1C illustrates the basic (e.g., first, or single input) convolutional block.
Figure 1D:
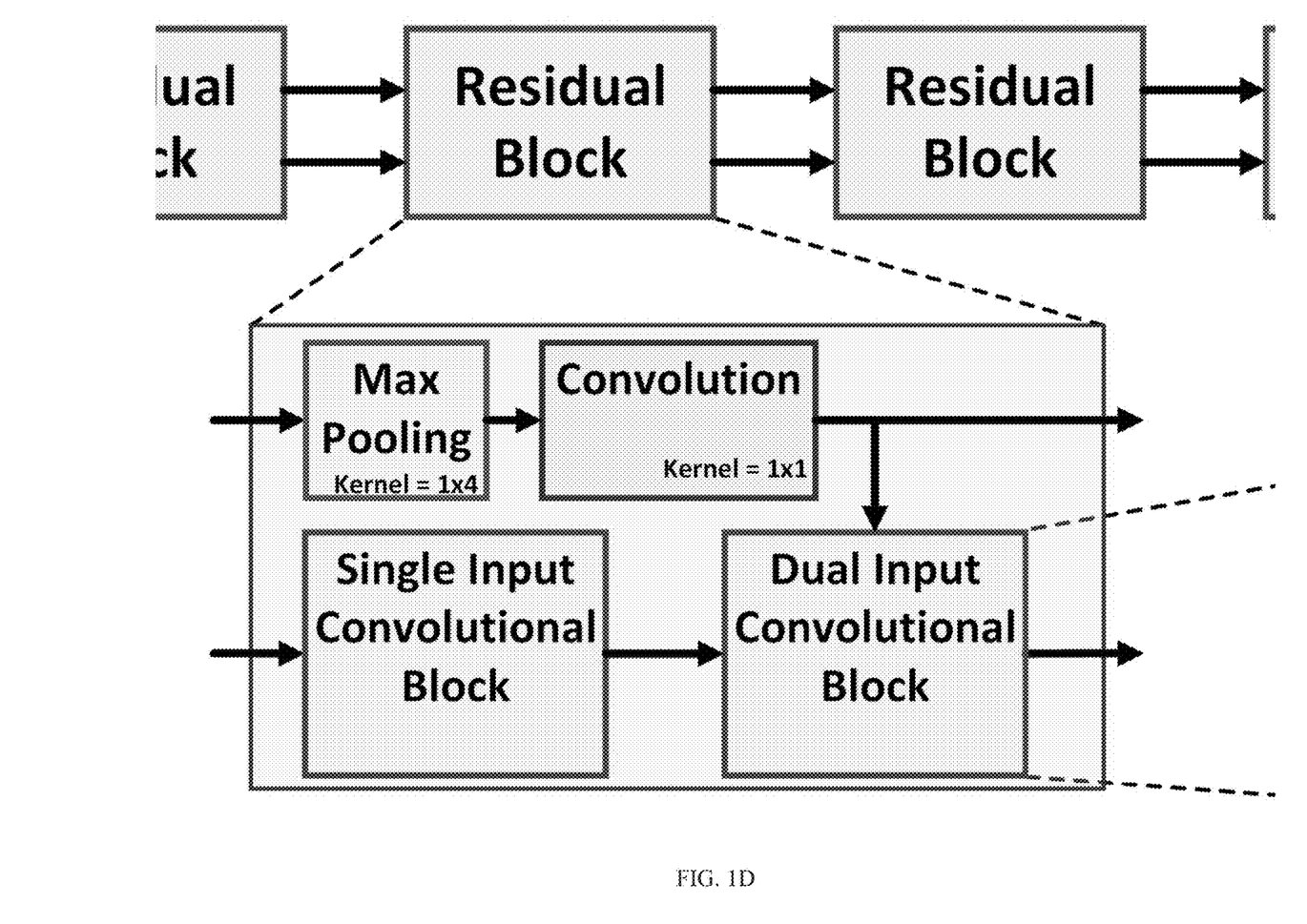
FIG. 1D illustrates the overall residual block.
Figure 1E:
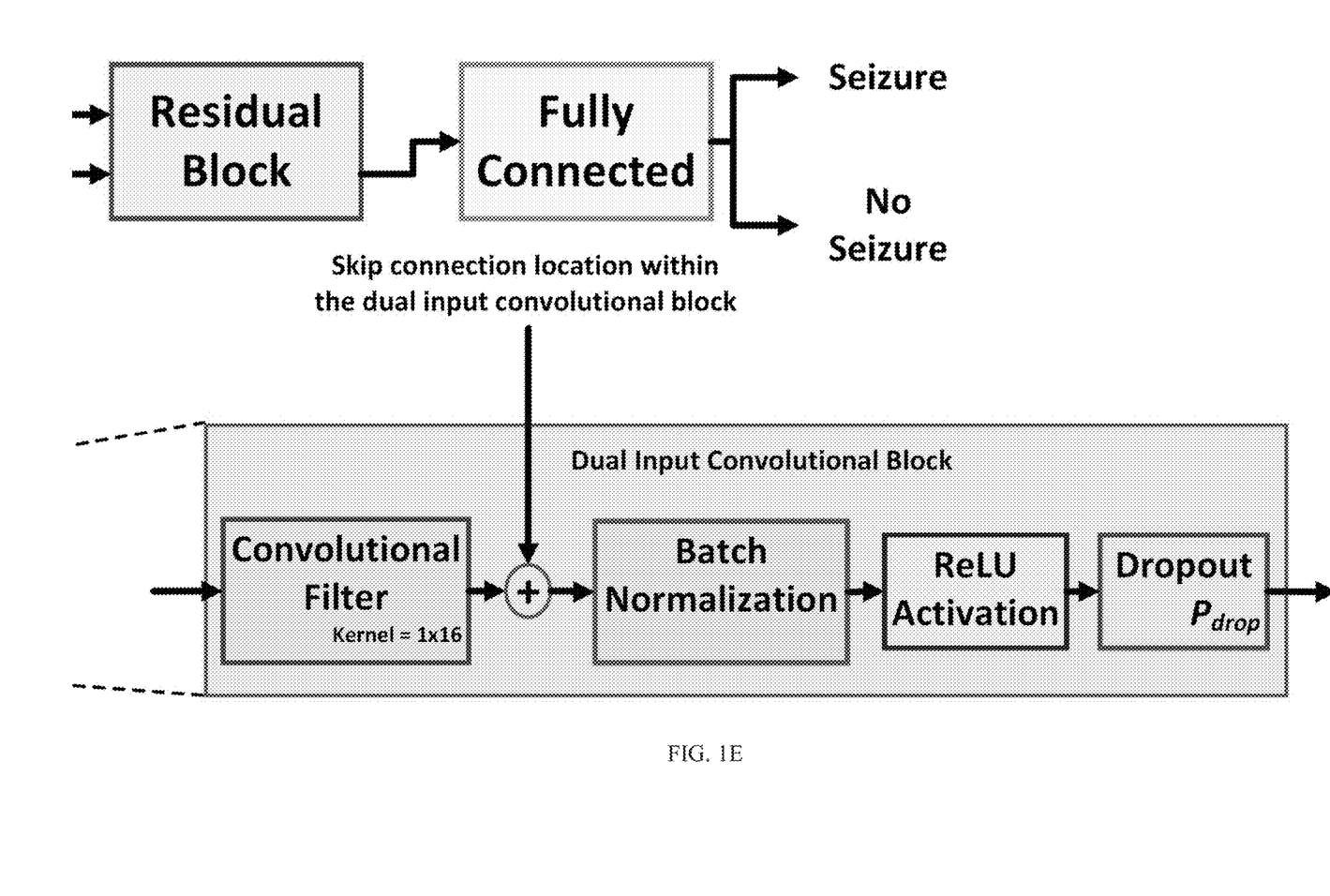
FIG. 1E illustrates the position of the skip connection within the second (e.g., dual input) convolutional block of the residual block.

In the above described embodiment, the total layers including the first SICB, 4 residual blocks, and 1 FC layer are 10. In certain embodiments, ResNet can provide up-to 152 layers which means up-to 75 residual blocks. However, the addition of each residual block adds ~1.1 million trainable parameters and about 370 million floating point operations (FLOPS). This will make the model less suitable for hardware implementation for real-time seizure prediction from wearable EEG which is the ultimate goal.

Although the inventors did not study the number of residual blocks as a hyperparameter due to adhering to strict TL methodology, without being bound by theory, the inventors hypothesize that embodiments utilizing a ResNet with more residual blocks (e.g., 5, 6, 7, or any number up to 75 residual blocks within current parameters) can provide improved performance at an increased cost of computational power with associated increases in power consumption, processing time, and cost. Again without being bound by theory, the inventors hypothesize that embodiments utilizing a ResNet with fewer residual blocks (e.g., 3, 2, or 1 residual blocks within current parameters) can provide reduced performance with savings of computational power with associated increases in power consumption, processing time, and cost. It is contemplated within the scope of the current invention that current and future developments or experimentation and tuning either with regard to ResNet or other machine learning methodologies, or with regard to computing resources and methods, can lead to embodiments with more or fewer layers and/or blocks, to provide optimal performance in a particular application. For example, increases in available remote or wearable computing power, dedicated or cloud based model training resources, storage, data transfer bandwidth, or power production, storage, transfer, or delivery can enhance the utility and benefits of more complex and computationally expensive models. Similarly, advances in data science and machine learning can enhance the utility and benefits of simpler and more computationally efficient models.

Evaluation metrics are considered as follows. Consider a seizure has occurred, a prediction of a seizure represents a true positive (TP) whereas a prediction of no seizure is a false negative (FN). In contrast, if a seizure has not occurred, a prediction of a seizure is a false positive (FP) and a true negative (TN) otherwise. Although the existence of FN's reduces the value of seizure prediction/detection technologies, FP's are as dangerous because they create anxiety, cause stress, and can lead to the discontinuation of usage over time. Embodiments can advantageously employ the following metrics:

$$\text{Sensitivity} = \frac{TP}{TP + FN} \quad (1)$$

$$\text{Specificity} = \frac{TN}{TN + FP}$$

$$\text{Accuracy} = \frac{TP + TN}{TP + TN + FP + FN}$$

The sensitivity is also known as the TP rate (TPR) which is the complement of the FN rate (FNR) such that (Sensitivity=TPR=1−FNR). This sensitivity will capture the ability of the classifier to reduce FN's. Because specificity is the TN rate which is the complement of the FP rate (Specificity=TNR−1−FPR), it will capture the ability to reduce FP's while correctly identifying TN's. Both metrics are important because the accuracy can, in certain cases, not capture the true performance in certain cases due to the severe class imbalance.

The classifier outputs a probability threshold and for balanced binary class problems, the threshold for a positive label is a probability of greater than 0.5. On the other hand, this strategy fails for class-imbalanced problems. During validation, the precision-recall curve (PRC) can be used to select an initial threshold based on the highest F1-score (2×Precision×Recall). The threshold can be tuned to ensure the maximum possible accuracy with lowest numbers of FNs/FPs and the final accuracy will be evaluated on the unseen test data. For the sake of stringent evaluation, embodiments report the results from the model directly where classification as a pre-ictal segment indicates a seizure and interictal indicates no seizure.

Figure 2:
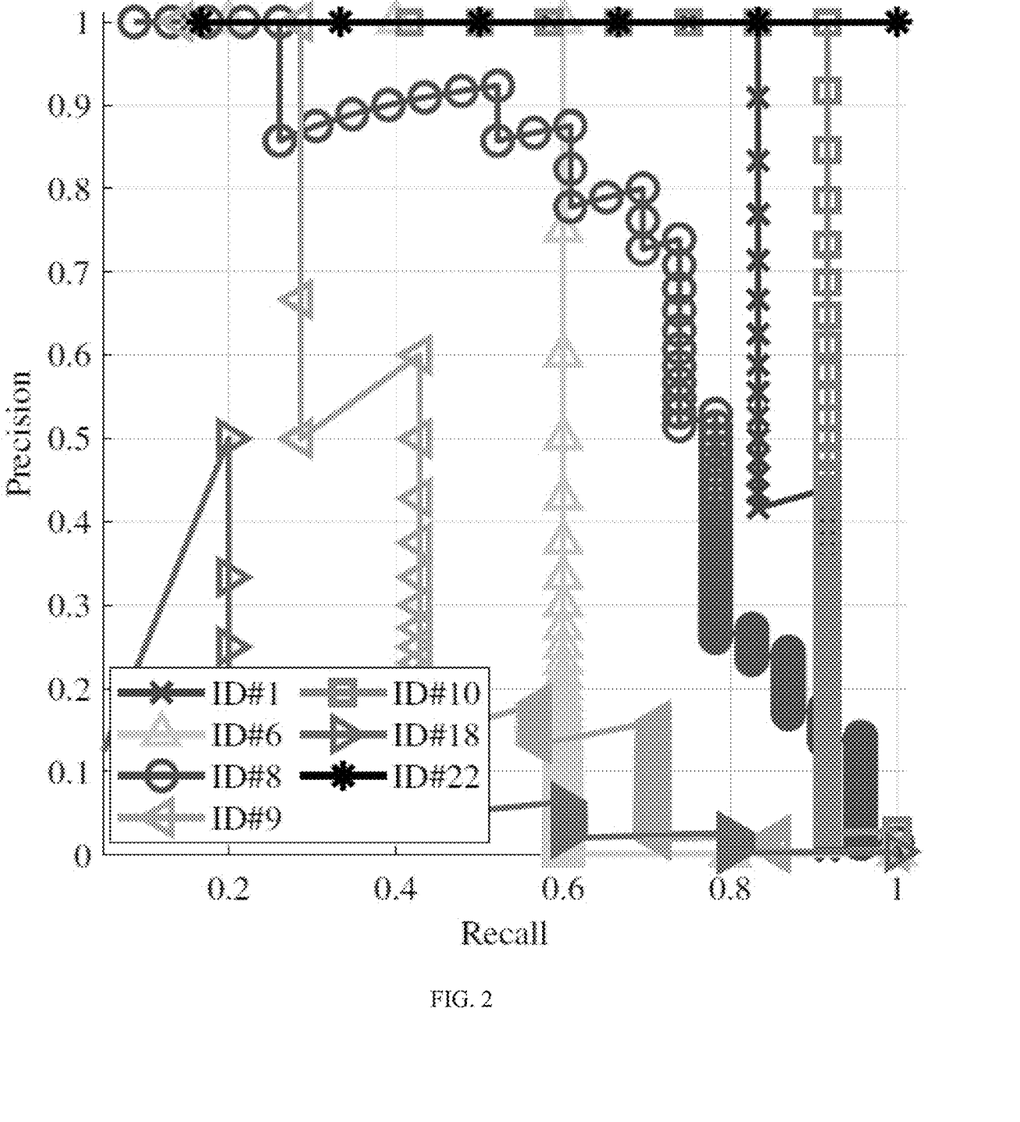
FIG. 2 is an illustration of the PRC curve drawn for several patients from their respective validation dataset, according to an embodiment of the subject invention. The threshold was selected such that it maximized the F-1 score.

FIG. 2 illustrates the PRC curve for a set of patients chosen from the complete 20 patients for illustrative purposes. Using validation data, generate a set of probabilities that are output by the model, and each point on the plot corresponds to a pair of either (Recall, Precision) or (FPR, TPR) achieved by setting that probability as a threshold for seizure vs non-seizure prediction. The ideal model should be able to achieve a perfect score for both, the precision and the recall, which is rarely possible in practical applications and hence, select the threshold that maximizes the F-1 score initially and then tune it. From FIG. 2, it is clear that SPERTL only achieves a perfect model for patient 22 during validation and this also translated into 100% test accuracy.

Table II shows the achieved sensitivity (sen.), specificity (spe.), and accuracy (acc.) for 20 patients in the CHB-MIT dataset by SPERTL. The patient ID's highlighted in bold font are for patients which were used for ES prediction in a related art system (see Wang et al., Power efficient refined seizure prediction algorithm based on an enhanced benchmarking, Scientific Reports, vol. 11, no. 1, p. 23498, December 2021, doi.org/10.1038/s41598-021-02798-8; which is hereby incorporated by reference herein in its entirety). The achieved average sensitivity is 91.20% and an average specificity of 93.80% is achieved for predicting a seizure 5 minutes ahead of time. Furthermore, a higher specificity indicates that the model was able to reduce the likelihood of generating FP's. However, this comes at a cost of a few FN's as it resulted in a lower sensitivity. For patients 5, 11 and 22, the designed model was able to differentiate between the pre-ictal and interictal segments perfectly even during the testing phase. For several patients, the model was able to achieve a perfect score for either sen. (ID's: 3, 14, 17, 18, 19, 21) or for spe. (ID's: 1, 3, 4 and 10). For the remaining patients, the model did achieved score of greater than 90% for at least one metric except for patient ID 7. Further, the case of patients 6 and 18 are outliers because despite performing very well for one metric, the other metric had a low score of 60%.

Comparing the above results related art systems and methods, it can be seen that embodiments of the provided ResNet model provided a higher accuracy compared to the work of Wang et al. (supra.) for all patients except for patient 6 where the provided model achieved accuracy of 60.0% which was lower compared to 77.4%. For patients 1 and 2, the provided model had a lower sensitivity of 83.3% and 60.0% compared to 88.4% and 82.7%, respectively, and a lower specificity of 60.0% compared to 66.5% for patient 18. All of these results are summarized in Table III. Specificity measures the ability of the model to identify true negatives while minimizing the false positives. For patient 18, the provided model actually has a sensitivity of 1 which means that all seizures are predicted (none is missed), i.e., there are 0 false negatives. In contrast, both the provided model and related art show a low specificity which indicates a high false positive rate for this particular patient. While not being bound by theory, the inventors hypothesize that this can be because there are very few seizures to begin with, the preictal duration is too low, and the preictal profile makes it very hard to predict an upcoming seizure.

TABLE II

TESTING RESULTS FOR SEIZURE PREDICTION WITH SPERTL

| ID | Sen. | Spe. | Acc. |
|---|---|---|---|
| 1 | 83.3% | 100.0% | 99.9% |
| 3 | 100.0% | 100.0% | 100.0% |
| 4 | 90.0% | 100.0% | 100.0% |
| 5 | 100.0% | 100.0% | 100.0% |
| 6 | 60.0% | 97.6% | 97.5% |
| 7 | 87.5% | 72.2% | 72.2% |
| 8 | 95.7% | 92.5% | 92.6% |
| 9 | 85.7% | 95.8% | 95.8% |
| 10 | 91.7% | 100.0% | 100.0% |
| 11 | 100.0% | 100.0% | 100.0% |
| 12 | 92.5% | 74.5% | 74.8% |
| 14 | 100.0% | 98.6% | 98.6% |
| 15 | 96.2% | 89.1% | 89.2% |
| 16 | 50.0% | 96.1% | 96.0% |
| 17 | 100.0% | 99.9% | 99.9% |
| 18 | 100.0% | 60.0% | 60.0% |
| 19 | 100.0% | 99.9% | 99.9% |
| 21 | 100.0% | 99.8% | 99.8% |
| 22 | 100.0% | 100.0% | 100.0% |
| 23 | 90.9% | 99.9% | 99.8% |
| Avg. | 91.2% | 93.8% | 93.8% |

TABLE III

SPERTL SEN., SPE. AND ACC. COMPARED TO STATE-OF-THE-ART [19]

| | Wang et al. [19] | | | SPERTL | | |
|---|---|---|---|---|---|---|
| ID | Sen. | Spe. | Acc. | Sen. | Spe. | Acc. |
| 1 | 88.4% | 91.2% | 89.8% | 83.3% | 100.0% | 99.9% |
| 6 | 82.7% | 66.2% | 74.4% | 60.0% | 97.6% | 97.5% |
| 8 | 78.5% | 83.3% | 80.9% | 95.7% | 92.5% | 92.6% |
| 9 | 81.4% | 71.9% | 76.7% | 85.7% | 95.8% | 95.8% |
| 10 | 75.8% | 71.7% | 73.8% | 91.7% | 100.0% | 100.0% |
| 18 | 88.4% | 66.5% | 77.4% | 100.0% | 60.0% | 60.0% |
| 22 | 90.7% | 63.3% | 77.0% | 100.0% | 100.0% | 100.0% |
| Avg | 82.7% | 72.4% | 77.6% | 88.1% | 92.3% | 92.3% |

Overall, Table III illustrates that SPERTL will be able to predict a higher number of seizures when used in real-time with wearable EEG as demonstrated by a higher sensitivity. SPERTL is also expected to generate a lower false alarm rate (FAR) based on the high specificity.

The higher accuracy is the result of higher specificity achieved by SPERTL, which also implies an ability improve the TNR which reduces the FPR. In Wang et al. (supra.), because only seizures with certain properties are chosen (at least one hour of preictal time and 4 hours of interictal time), the class imbalance is lower. Despite using the complete dataset, the ability of SPERTL to have a lower number of FP's is desirable. One reason for this may be the ability of ResNets to deal with class-imbalance. For example, a simple 34-layer ResNet without stacked layers can reduce the top-1 error rate by 3.50% compared to plain CNNs for ImageNet classification. Compared to such tasks, medical event detection/prediction is even more imbalanced which highlights ResNet superiority.

In this example, the inventors have successfully developed a model, SPERTL, which used heterogeneous transfer-learning techniques to train a ResNet for early ES prediction from EEG data. The provided model was trained and tested on a set of 20 patients from the CHB-MIT dataset for patient-specific 5-minute-ahead seizure prediction. The provided experiments have shown superior capability to differentiate between pre-ictal and inter-ictal segments and outperformed the related art systems and methods in terms of sensitivity by 5.4%, specificity by 19.9%, and accuracy by 14.7%. This embodiment has provided great preliminary results, and the inventors are working towards further embodiments, contemplated within the scope of the subject invention, improving the seizure prediction accuracy within a given SOP which will result in lower false alarm rates. Other embodiments contemplated within the scope of the subject invention include developing energy-efficient federated models for real-time deployment on hardware.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all figures and tables, to the extent they are not inconsistent with the explicit teachings of this specification.

What is claimed is:

1. A system for patient-specific epileptic seizure(ES) prediction from raw electroencephalography (EEG) data with a deep learning (DL) model based on a residual neural network (ResNet) and transfer learning (TL), the system comprising: a processor; and a machine-readable medium having instructions stored thereon that, when executed by the processor perform the following steps: providing a trained DL model for binary classification of a first disorder, the trained DL model having been trained on a first dataset comprising time indexed sensor response data and disorder occurrence data for at least one million patients to produce a first trained DL model; further training the first trained DL model for binary classification of an ES disorder with TL on a second dataset comprising time indexed raw EEG data and ES occurrence data for less than one million patients to produce a second trained DL model; processing a stream of time indexed, raw EEG data from a patient through the second trained DL model to produce a binary classification prediction of either Seizure or No-Seizure for a specified seizure prediction horizon (SPH) time period; and communicating, either to the patient or to a caregiver for the patient, the binary classification prediction of either Seizure or No-Seizure for the specified SPH, thus providing the ES prediction from raw EEG data, the second trained DL model being a ResNet DL model configured to accept raw EEG data as input to a convolutional input block followed by a multiplicity of residual blocks and a fully connected layer, producing the binary classification prediction, each respective residual block of the multiplicity of residual blocks comprising a single input convolutional block and a dual input convolutional block, the dual input convolutional block accepting (i) the output of the single input convolutional block within the residual block, and (ii) the output of a skip connection from the previous block, after max pooling and 1×1 convolution, each respective dual input convolutional block comprising a second convolutional filter, a second batch normalization, and an input junction configured to receive the skip connection from the previous block, the input junction configured to receive the skip connection being located after the second convolutional filter and before the second batch normalization of the respective dual input convolutional block, the convolutional input block having a dropout probability of 0, the single input convolutional block of each respective residual block of the multiplicity of residual blocks having a dropout probability of 0.8, the dual input convolutional block of each respective residual block of the multiplicity of residual blocks having a dropout probability of 0.8, and the second trained DL model flattening output of a last residual block of the multiplicity of residual blocks to generate flattened output before providing the flattened output directly to the fully connected layer.

2. The system according to claim 1, each respective dual input convolutional block further comprising a second rectified linear unit (ReLU) activation located after the second batch normalization, and a second dropout located after the second ReLU activation.

3. The system according to claim 2, each respective single input convolutional block comprising a first convolutional filter, a first batch normalization, a first rectified linear unit (ReLU) activation, and a first dropout.

4. The system according to claim 3, the convolutional input block comprising an input convolutional filter, an input batch normalization, an input rectified linear unit (iReLU) activation, and an input dropout.

5. The system according to claim 4, the input convolutional filter feeding the input batch normalization, the input batch normalization feeding the iReLU activation, and the iReLU activation feeding the input dropout.

6. The system according to claim 1, the multiplicity of residual blocks comprising 4 respective residual blocks.

7. The system according to claim 1, the ResNet DL model comprising sigmoid activation for classification prior to producing the binary classification prediction.

8. A method for patient-specific epileptic seizure(ES) prediction from raw electroencephalography (EEG) data with a deep learning (DL) model based on a residual neural network (ResNet) and transfer learning (TL), the method comprising the following steps: providing a trained DL model trained for binary classification of a first disorder on a first dataset comprising time indexed sensor response data and disorder occurrence data for at least 1 million patients to produce a first trained DL model; further training the first trained DL model for binary classification of an ES disorder with TL on a second dataset comprising time indexed raw EEG data and ES occurrence data for less than 1 million patients to produce a second trained DL model; processing a stream of time indexed, raw EEG data from a patient through the second trained DL model to produce a binary classification prediction of either Seizure or No-Seizure for a specified seizure prediction horizon (SPH) time period; and communicating, either to the patient or to a caregiver for the patient, the binary classification prediction of either Seizure or No-Seizure for the specified SPH, thus providing the ES prediction from raw EEG data, the second trained DL model being a ResNet DL model configured to accept raw EEG data as input to a convolutional input block followed by a multiplicity of residual blocks and a fully connected layer, producing the binary classification prediction, each respective residual block of the multiplicity of residual blocks comprising a single input convolutional block and a dual input convolutional block, the dual input convolutional block accepting (i) the output of the single input convolutional block within the residual block, and (ii) the output of a skip connection from the previous block, after max pooling and 1×1 convolution, each respective dual input convolutional block comprising a second convolutional filter, a second batch normalization, and an input junction configured to receive the skip connection from the previous block, the input junction configured to receive the skip connection being located after the second convolutional filter and before the second batch normalization of the respective dual input convolutional block, the convolutional input block having a dropout probability of 0, the single input convolutional block of each respective residual block of the multiplicity of residual blocks having a dropout probability of 0.8, the dual input convolutional block of each respective residual block of the multiplicity of residual blocks having a dropout probability of 0.8, and the second trained DL model flattening output of a last residual block of the multiplicity of residual blocks to generate flattened output before providing the flattened output directly to the fully connected layer.

9. The method according to claim 8, each respective dual input convolutional block further comprising a second rectified linear unit (ReLU) activation located after the second batch normalization, and a dropout located after the second ReLU activation.

10. The method according to claim 9, each respective single input convolutional block comprising a first convolutional filter, a first batch normalization, a first rectified linear unit (ReLU) activation, and a first dropout.

11. The method according to claim 10, the convolutional input block comprising an input convolutional filter, an input batch normalization, an input rectified linear unit (iReLU) activation, and an input dropout.

12. The method according to claim 11, the input convolutional filter feeding the input batch normalization; the input batch normalization feeding the iReLU activation; and the iReLU activation feeding the input dropout.

13. The method according to claim 8, the multiplicity of residual blocks comprising 4 respective residual blocks.

14. A system for patient-specific epileptic seizure(ES) prediction from raw electroencephalography (EEG) data with a deep learning (DL) model based on a residual neural network (ResNet) and transfer learning (TL), the system comprising: a processor; and a machine-readable medium having instructions stored thereon that, when executed by the processor perform the following steps: providing a trained DL model for binary classification of a first disorder, the trained DL model having been trained on a first dataset comprising time indexed sensor response data and disorder occurrence data for at least 1 million patients to produce a first trained DL model; further training the first trained DL model for binary classification of an ES disorder with TL on a second dataset comprising time indexed raw EEG data and ES occurrence data for less than 1 million patients to produce a second trained DL model; processing a stream of time indexed, raw EEG data from a patient through the second trained DL model to produce a binary classification prediction of either Seizure or No-Seizure for a specified seizure prediction horizon (SPH) time period; and communicating, either to the patient or to a caregiver for the patient, the binary classification prediction of either Seizure or No-Seizure for the specified SPH, thus providing the ES prediction from raw EEG data, the second trained DL model being a ResNet DL model configured to accept raw EEG data as input to a convolutional input block followed by a multiplicity of residual blocks and a fully connected layer, producing the binary classification prediction, each respective residual block of the multiplicity of residual blocks comprising a single input convolutional block and a dual input convolutional block, the dual input convolutional block accepting (i) the output of the single input convolutional block within the residual block, and (ii) the output of a skip connection from the previous block, after max pooling and 1×1 convolution, each respective dual input convolutional block comprising a second convolutional filter, a second batch normalization, and an input junction configured to receive the skip connection from the previous block, the input junction configured to receive the skip connection being located after the second convolutional filter and before the second batch normalization of the respective dual input convolutional block, each respective dual input convolutional block further comprising a second rectified linear unit (ReLU) activation located after the second batch normalization, and a second dropout located after the second ReLU activation, each respective single input convolutional block comprising a first convolutional filter, a first batch normalization, a first rectified linear unit (ReLU) activation, and a first dropout, the convolutional input block comprising an input convolutional filter, an input batch normalization, an input rectified linear unit (iReLU) activation, and an input dropout, the input convolutional filter feeding the input batch normalization; the input batch normalization feeding the iReLU activation; and the iReLU activation feeding the input dropout, the multiplicity of residual blocks comprising 4 respective residual blocks, the ResNet DL model comprising sigmoid activation for classification prior to producing the binary classification prediction, the convolutional input block having a dropout probability of 0, the single input convolutional block of each respective residual block of the multiplicity of residual blocks having a dropout probability of 0.8, the dual input convolutional block of each respective residual block of the multiplicity of residual blocks having a dropout probability of 0.8, and the second trained DL model flattening output of a last residual block of the multiplicity of residual blocks to generate flattened output before providing the flattened output directly to the fully connected layer.

15. The system according to claim 14, the input junction configured to receive the skip connection being located immediately after the second convolutional filter and immediately before the second batch normalization in each respective dual input convolutional block.

16. The system according to claim 1, the input junction configured to receive the skip connection being located immediately after the second convolutional filter and immediately before the second batch normalization in each respective dual input convolutional block.

17. The method according to claim 8, the input junction configured to receive the skip connection being located immediately after the second convolutional filter and immediately before the second batch normalization in each respective dual input convolutional block.

\* \* \* \* \*